Dec. 5, 1961    F. J. FEAGIN ET AL    3,011,583
SIGNAL DELAYING SYSTEM
Filed Nov. 21, 1957
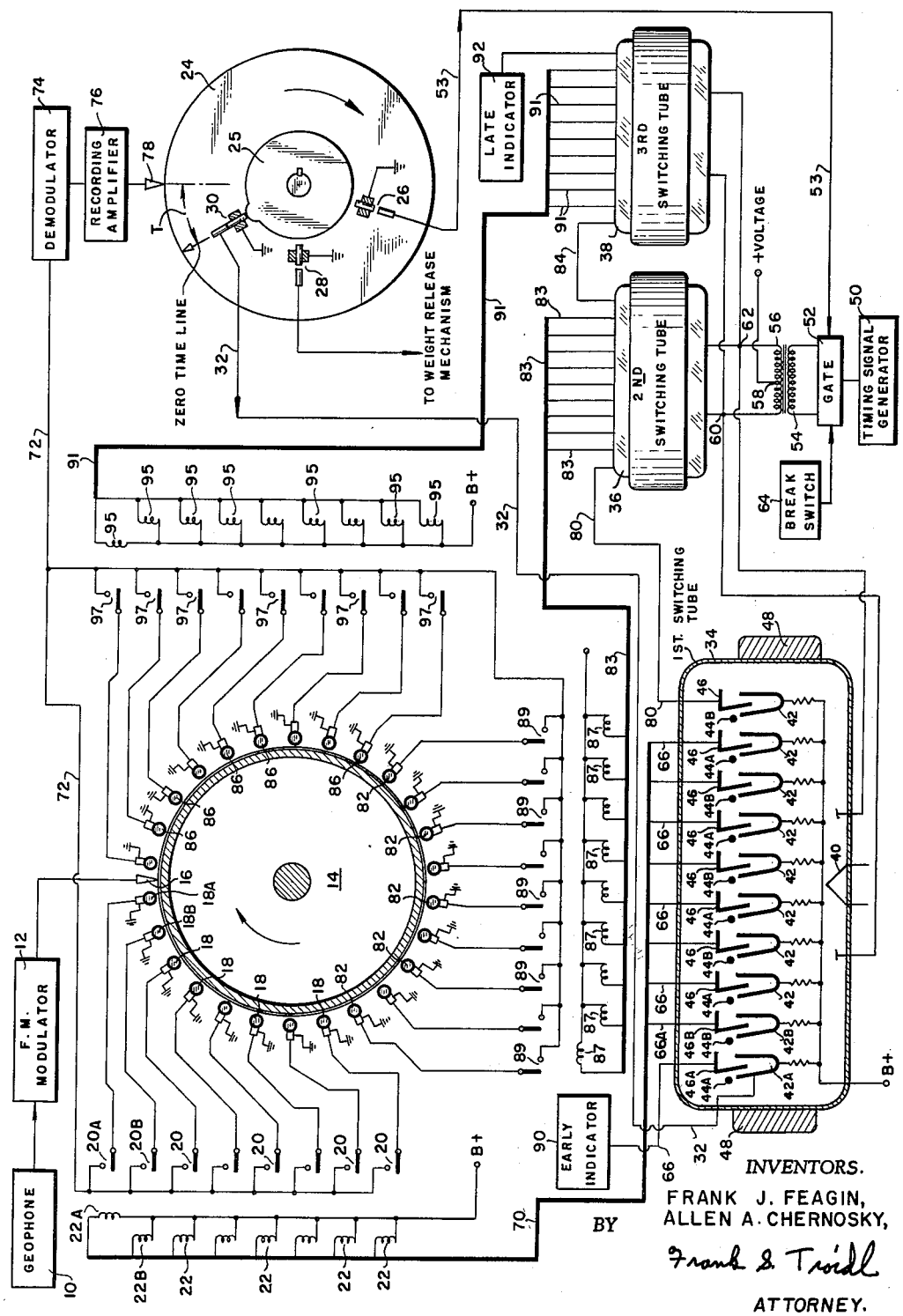
INVENTORS.
FRANK J. FEAGIN,
ALLEN A. CHERNOSKY,
BY Frank S. Troidl
ATTORNEY.

United States Patent Office 3,011,583
Patented Dec. 5, 1961

3,011,583
SIGNAL DELAYING SYSTEM
Frank J. Feagin and Allen A. Chernosky, Houston, Tex., assignors, by mesne assignments, to Jersey Production Research Company, Tulsa, Okla., a corporation of Delaware
Filed Nov. 21, 1957, Ser. No. 697,958
6 Claims. (Cl. 181—.5)

This invention relates to systems for automatically delaying received signals before they are recorded.

The invention described herein is a novel, improved system for lining up signals on a recording medium. This invention has particular application to seismic prospecting utilizing a heavy weight. The heavy weight is released from some height above the ground level. When the weight hits the ground, seismic signals are generated from the point of impact. Some of the generated seismic waves are reflected by boundaries separating two subsurface strata which have different physical properties, such as differences in density, elasticity, acoustic impedance, and so forth. The reflected waves are detected by geophones and recorded on a recording medium. The resulting seismic traces are examined by seismic computers, from which information as to the depths of various subsurface strata can be obtained.

The time required for the weight to drop from the release position to the ground generally varies for each dropping. The falling time of the weight varies with the height of the weight above the terrain and the contour of the terrain. Variable time delays are also introduced by the release mechanisms, such as relays, valves, solenoids, and the hoist.

An electric switch included on the weight is activated as the weight hits the ground and sends a pulse through an electrical system. The pulse is recorded on a recording medium, such as a rotatable magnetic drum. Even though the weight is released as a specific point on the drum passes a specific stationary point on the frame of the drum, the successive pulses resulting from successive weight impacts will not be lined up across the drum because of the variable time delays between the release of the weight and its impact with the ground.

For the best presentation of seismic data, the beginnings of all of the seismic traces should line up. A current practice is to record the seismic traces without any means for automatically lining up the beginnings or breaks of all the traces. After the traces have been recorded, they are re-recorded onto another recording medium. Prior to the re-recording, the playback heads are manually shifted to correct for the variable time delays aforementioned.

It is highly desirable, therefore, for geophysical prospectors to have a system which automatically corrects for these variable time delays as the seismic traces are recorded. With such a system the geophysicist can obtain corrected records in the field. This would eliminate the necessity of taking an uncorrected recording in the field and then re-recording the traces in the laboratory with the corrections applied.

It is an object, therefore, of this invention to provide in its broadest aspects a new system for automatically delaying signals.

It is a further object of this invention to provide a new system for use in automatically correcting for the variable time between the release of a weight and its impact upon the ground, as used in certain kinds of seismic prospecting.

Briefly described, our new system includes a recording means for recording on a movable recording means a signal-to-be-delayed. A plurality of signal detectors are arranged with respect to the movable recording means so that a recorded signal will pass by the detectors in time sequence. The detectors are sequentially activated and deactivated starting with the detector furthest away in time from the recording means. That is, the detector furthest away is activated and then deactivated, then the next furthest detector is activated and deactivated; etc. Means are provided for discontinuing the sequential activating and deactivating of the detectors and holding the last activated detector in an activated state. When the recorded signal is detected by the last activated detector, it will have been delayed by an amount determined by the position of said detector.

When our new system is used for automatically delaying a seismic signal obtained by dropping a weight, the plurality of detectors are arranged so that the recorded signal will pass under the detectors in equal time sequence. The sequential activating and deactivating of the detectors is initiated a fixed length of time after release of the weight and just before the normal instant of impact of the weight on the ground. The sequential activating and deactivating of the detectors is discontinued in response to the signal from the impact of the weight upon the ground and the last activated detector is held in an activated state. The recorded signal will be delayed by an amount determined by the position of the activated detector, which is in turn a function of the time it takes the weight to reach the ground.

A better understanding of this invention, as well as its many advantages, may be obtained by examining the single figure, which is a view partially schematic and partially in block form, illustrating one embodiment of the invention.

After the weight has been released, the generated seismic waves are detected by a geophone 10. Though only one geophone is shown in the figure, it is to be understood that if desired, a plurality of geophones connected in an array may be used in place of geophone 10.

The detected seismic waves are fed to a F.M. modulator 12, and from modulator 12 the seismic signals are recorded upon a delaying circuit magnetic drum 14 by means of a combination erase-record magnetic head 16. Drum 14 is rotated at a constant speed in a clockwise direction, as shown by the arrow.

Circumferentially arranged about the rotatable magnetic drum 14 are a plurality of signal detectors, such as the magnetic heads 18. The activation and deactivation of the magnetic heads 18 is controlled by means of switches 20 operated by coils 22. One switch is used to control the operation of each magnetic head 18.

A primary rotatable magnetic drum 24 is used to record the delayed seismic signal after it has been delayed by means of the delaying rotatable magnetic drum 14 and auxiliary equipment, in a manner to be subsequently described. A cam 25 is located upon the magnetic drum 24 and rotates therewith to sequentially operate a reset switch 26, a weight release switch 28, and a start-pulse switch 30.

When the start-pulse switch 30 is activated by the cam 25 on rotatable drum 24, a negative pulse is fed through line 32 to a step switching tube means. The step switching tube system functions to control the sequential activation and deactivation of the plurality of switches 20 which control the magnetic heads 18. The switching means illustrated consists of a plurality of magnetron beam switching tubes 34, 36, and 38. Each of the beam switching tubes are similar in structure. Therefore, the specific structure of only one beam switching tube 34 is illustrated, it being understood that switching tubes 36 and 38 are of similar structure.

Each magnetron beam switching tube includes a cathode 40, a plurality of spades 42, a plurality of switching grids 44A, 44B, and a plurality of targets 46. A permanent magnet 48 is mounted upon the envelope of the magnetron beam switching tube.

Actually, the magnetron beam switching tube 34 is circular in cross-section. The cathode is a cylindrical cathode located along the axis of the tube. The targets, with their spades and switching grids, are arranged in a circular manner around the tube. The permanent magnet 48 is cylindrical in form and surrounds the envelope. The magnetron beam switching tube is illustrated as an elongated tube in the figure to better illustrate and explain the operation of the tube.

The magnetic flux of the magnet 48 runs axially along the tube. Under normal conditions the electrons emitted by cathode 40 are deflected by the magnet 48 and none of the electrons reach any of the targets 46. Hence, no current flows from any of the targets. However, if a negative pulse is supplied to one of the spades 42, an electron beam will flow from the cathode 40 to the particular target controlled by the spade which has received the negative pulse. Once the magnetron switching tube is put into operation by receipt of the negative pulse at one of the spades, the beam is made to jump from one target to the next adjacent target by means of an alternating timing signal supplied to the grids 44A, 44B. The direction in which the beam jumps is determined by the direction of the magnetic field.

When the start-pulse from switch 30 is fed to spade 42A of the magnetron beam switching tube 34, the electron beam flows from cathode 40 to target 46A. The beam then steps from target 46A to each of the other targets from left to right, looking at the figure. The rate at which the beam is switched from one target to another is controlled by means of a timing signal from a timing signal generator 50, through a gate circuit 52 which has been previously opened by means of a reset pulse conducted through line 53 when the cam on rotatable drum 24 actuated the switch 26. The alternating signal is fed from the gate circuit 52 to a primary coil 54 of an iron core transformer. The secondary coil 56 of the iron core transformer has its two end terminals connected to the switching grids 44. The secondary coil 56 is center-tapped at point 58 to which is fed a positive voltage.

The switching grids 44A are connected in common to the terminal 60 of the secondary coil 56 (the connections are not shown. The switching grids 44B are connected in common to the other side 62 of the secondary coil 56 (connections not shown). Hence, it can be seen that alternate switching grids are connected in common. By the foregoing means the timing signal causes the beam to switch from one plate to the next plate at a rate of speed which is twice the frequency of the timing signal generator (one step for each one-half cycle of timing signal). If a timing signal of 250 cycles per second is used, the beam moves from one target to the next every two milliseconds.

The closing of the gate circuit 52 is accomplished by a pulse from the breakswitch 64 connected to the dropping weight. A pulse is fed from breakswitch 64 to close the gate 52 when the weight hits the ground. When the gate 52 is closed, the timing signal is no longer able to reach the switching grids 44A, 44B and the electron beam remains locked at the particular target to which the electron beam was flowing at the time of the closing of the gate circuit 52. The seismic waves generated by the falling weight are picked up by geophone 10 and recorded on drum 14 and detected by the actuated magnetic head.

A separate line 66 leads from each of the targets to a separate relay 22. To simplify the drawing, the separate lines 66 leading to separate relays 22 are indicated by heavy line 70. In this manner, for example, current fed through line 66A will activate relay 22A, thus closing switch 20A to activate the magnetic head 18A. As the electron beam in the magnetron switching tube moves from target 46B to the next adjacent target, the relay 22A is deactivated to open switch 20A and deactivate head 18A, and relay 22B operates switch 20B to activate magnetic head 18B, and so forth. It can be seen, therefore, that the plurality of switches 20 are closed and opened sequentially by the switching tube to sequentially activate the magnetic heads, starting with the magnetic head furthest away in time from the recording head 16. The time between each closing and opening operation is controlled by the timing signal fed to the switching tube from timing signal generator 50.

As the recorded signal on rotatable drum 14 rotates with the drum, it will pass under each head 18. The recorded signal is not detected by the heads which are not activated as the signal passes thereunder. However, as the recorded signal passes under the activated head, the signal is detected by said activated head and an electrical signal is fed through cable 72 to demodulator 74 and a recording amplifier 76, and the signal is recorded on the rotatable magnetic drum 24 by recording head 78.

*Operation*

When the cam on the drum 24 closes switch 28, the weight release mechanism drops the weight. A fixed time thereafter (in one modification, 800 milliseconds) the cam on drum 24 closes start-pulse switch 30 to initiate the operate of the magnetron beam switching tube 34.

The electron beam switches from one target to the next target in switching tube 34 under control of the timing signal to sequentially close and open the switches 20 to sequentially activate and deactivate the magnetic heads 18, starting with head 18A, the head furthest away in time from the recording head 16.

When the weight hits the ground, the pulse from the breakswitch 64 closes gate 52. This action stops the sequential switching of the beam in the switching tubes 34, 36, and 38; and the beam stays thereafter at its last conducting position. The magnetic head corresponding to that position is held activated. The generated seismic waves are recorded on drum 14 and then detected by the activated head. The detected signal is recorded on drum 24.

If the break pulse from the breakswitch 64 has not been received by the gate circuit 52 before the electron beam switches to the last target of beam switching tube 34, the switching operation is switched to the second magnetron beam switching tube 36 by a current fed through line 80. Second magnetron beam switching tube 36 controls the sequential activation and deactivation of a second set of magnetic heads 82 through lines 83, relays 87, and switches 89. If the pulse from the breakswitch 64 has not been received by the gate circuit 52 during the course of movement of the electron beam through switching tube 36, the third switching tube 38 is activated by a current through line 84 to control the sequential activation and deactivation of a third set of magnetic heads 86 through lines 91, relays 95, and switches 97. The actual number of switching tubes used depends on the results desired.

The seismic trace recorded on magnetic drum 24 is delayed in time by an amount dependent upon the circumferential position of the activated magnetic head on the delay circuit magnetic drum 14.

At the beginning of the next drop-record cycle, the reset switch 26 is operated to send a pulse through line 53 to gate circuit 52 to open the gate circuit. The beam then traverses the rest of the positions, extinguishing at the last position and the system returned to its initial state a fraction of a second ahead of the next activation sequence. The cycle is repeated for each weight dropping. Since head 78 is fixed relative to drum 24, the beginnings of the successive seismic traces corresponding to successive drops are thus in line on drum 24.

The activation of the switching tube 34 by closing of switch 30 begins a given amount of time, T, before the zero time line arrives under head 78. The time, T, is long enough so that the break pulse will ordinarily occur during the interval, T. It takes the same T seconds for the drum 14 to rotate from head 16 to head 18A.

The head that is held activated on the signal delaying drum 14 is that head which will delay the break pulse (and the signal that follows) as necessary to cause the pulse to be properly aligned on the zero time line on drum 24.

If the weight hits the ground too early to be corrected, the electron beam remains locked at target 46A and operates an "early" indicator 90. If the weight hits the ground too late to be corrected, the beam switches through all positions of all of the switching tubes and operates a "late" indicator 92.

It is to be understood that various modifications may be made to the described system without departing from the scope of the appended claims.

We claim:

1. A system for use in automatically delaying a seismic signal obtained by dropping a weight comprising: a geophone for detecting the seismic signal and producing a corresponding electric signal; a movable recording medium; a recording member located at a point adjacent the movable recording medium and connected to the geophone to receive the corresponding electric signals therefrom and record signals on the movable recording medium corresponding in time to the detection of the seismic signal by the geophone; a plurality of signal detectors equally spaced apart along the direction of movement of the movable recording medium and adjacent thereto; an electrical circuit system including a source of voltage, a separate electrical conducting line connected to each of the signal detectors and at least one stepping switch connected in the electrical system in a manner to sequentially activate and deactivate the signal detectors, starting with the detector furthest away from the recording member along the direction of movement of the recording medium; a switch in the electrical circuit system for initiating the sequential activating and deactivating of the signal detectors after the release of the weight; and an electric signal generating member attached to the weight and forming part of the electrical circuit system, said electric signal generating member being responsive to the impact of the weight upon the ground for discontinuing the sequential activating and deactivating of the detectors and holding the last activated detector in an activated state so that when the seismic signal is recorded on the movable recording medium and then detected by said activated detector, it will have been delayed by an amount determined by the position of said activated detector.

2. A system in accordance with claim 1 wherein the movable recording medium is a rotatable magnetic drum and the detectors are magnetic heads.

3. A system for use in automatically delaying a seismic signal obtained by dropping a weight comprising: a geophone for detecting the seismic signal and producing a corresponding electric signal; a first movable recording medium; a recording member located at a point adjacent the first movable recording medium and connected to the geophone to receive the corresponding electric signals therefrom and record signals on the first movable recording medium corresponding in time to the detection of the seismic signal by the geophone; a plurality of magnetic heads equally spaced apart along the direction of movement of the first movable recording medium and adjacent thereto; a first electrical circuit including a source of voltage, a separate electrical conducting line connected to each of the magnetic heads and at least one stepping switch connected in the first electrical system in a manner to sequentially activate and deactivate the magnetic heads, starting with the head furthest away from the recording member along the direction of movement of the first recording medium; a switch in the first electrical circuit for initiating the sequential activating and deactivating of the magnetic heads after the release of the weight; a second electrical circuit including an electric signal generating member attached to the weight and responsive to the impact of the weight upon the ground for discontinuing the sequential activating and deactivating of the magnetic heads and holding the last activated magnetic head in an activated state; a second movable recording medium; and a third electrical circuit including the magnetic heads and a recording member adjacent the second movable recording medium whereby the seismic trace recorded on the first movable recording medium is sensed by the activated magnetic head and recorded on the second movable recording medium but delayed in time by an amount dependent upon the location of the activated magnetic head on the first movable recording medium.

4. A system in accordance with claim 3 wherein the first and second movable recording media are rotatable magnetic drums.

5. A system for use in seismic prospecting by dropping a weight having a breakswitch thereon for sending a signal when the weight hits the ground and generates seismic waves: a geophone for detecting the seismic waves and producing corresponding electric signals; a first movable recording medium; a recording member electrically connected to the geophone and located at a point adjacent the first movable recording medium to receive the corresponding electric signals and record signals on the first movable recording medium corresponding in time to the detection of the seismic waves by the geophone; a plurality of equally spaced-apart magnetic heads arranged sequentially along the direction of movement of the first movable recording medium and adjacent thereto; a first electrical circuit including a source of voltage, a separate electrical conducting line connected to each magnetic head, a stepping switch, and a magnetic head control switching arrangement interconnected in a manner to sequentially activate and deactivate the magnetic heads, starting with the magnetic head furthest away from the recording member along the direction of movement of the recording medium; a timing signal generator electrically connected to the stepping switch through a gate circuit, said timing signal generator serving to control the time between each successive activation and deactivation of the magnetic heads when the gate circuit is open; an electric line interconnecting the breakswitch and the gate circuit, said gate circuit being closed in response to a signal from the breakswitch resulting from the impact of the weight on the ground to hold in an activated state the magnetic head which was activated just prior to the receipt by the gate circuit of the pulse from the breakswitch and discontinue the sequential activating and deactivating of the magnetic heads; a second movable recording medium; a recording member mounted adjacent to the second movable recording medium and electrically connected to the magnetic head control switching arrangement so that when the recorded signals on the first movable recording medium are sensed by the activated magnetic head and recorded on the second movable recording medium, it will have been delayed in time by an amount dependent upon the position of the activated magnetic head; and a reset switch electrically connected to the gate circuit whereby the gate circuit can be opened to return the system to its initial state preparatory to the recording of another seismic trace.

6. A system in accordance with claim 5 wherein the stepping switch is an electronic switching tube, the first and second recording media are rotatable magnetic drums, and the magnetic heads are circumferentially arranged about the first rotatable magnetic drum.

(References on following page)

References Cited in the file of this patent

UNITED STATES PATENTS

| | | |
|---|---|---|
| 2,275,736 | Cloud | Mar. 10, 1942 |
| 2,478,778 | Oliver | Aug. 9, 1949 |
| 2,688,124 | Doty et al. | Aug. 31, 1954 |
| 2,801,351 | Calvert et al. | July 30, 1957 |
| 2,807,002 | Cherin | Sept. 17, 1957 |

OTHER REFERENCES

Waldie: "Weight-Drop Technique," World Oil Magazine, April 1956, pages 148, 150, 153–156 and 158.